(12) United States Patent
Kuwahara

(10) Patent No.: US 6,728,539 B2
(45) Date of Patent: Apr. 27, 2004

(54) METHOD OF REGISTERING LOCATION IN MOBILE COMMUNICATION SYSTEM AND MOBILE DEVICE USED IN SAID METHOD

(75) Inventor: Soichi Kuwahara, Fukuoka (JP)

(73) Assignee: Fujitsu Limited, Kawasaki (JP)

(*) Notice: Subject to any disclaimer, the term of this patent is extended or adjusted under 35 U.S.C. 154(b) by 472 days.

(21) Appl. No.: 09/767,561

(22) Filed: Jan. 23, 2001

(65) Prior Publication Data

US 2001/0034232 A1 Oct. 25, 2001

(30) Foreign Application Priority Data

Apr. 21, 2000 (JP) ........................................ 2000-121675

(51) Int. Cl.[7] .............................................. H04Q 7/20
(52) U.S. Cl. ................................ 455/435.1; 455/456.1; 370/336
(58) Field of Search ......................... 455/456.1, 435.1, 455/458, 422, 423, 425, 432, 433, 434, 435, 436, 439, 440, 450, 452, 456, 457, 459–464, 517, 519, 525, 671, 556, 560, 575; 370/336, 335, 331

(56) References Cited

U.S. PATENT DOCUMENTS

| | | | | |
|---|---|---|---|---|
| 5,470,233 A | * | 11/1995 | Fruchterman et al. | 434/112 |
| 5,528,247 A | * | 6/1996 | Nonami | 342/357 |
| 5,572,221 A | | 11/1996 | Marlevi et al. | |
| 5,594,947 A | * | 1/1997 | Grube et al. | 455/54.2 |
| 5,799,256 A | * | 8/1998 | Pombo et al. | 455/574 |
| 5,825,759 A | | 10/1998 | Liu | |
| 5,857,155 A | * | 1/1999 | Hill et al. | 455/456 |
| 6,195,555 B1 | * | 2/2001 | Dent | 455/456 |
| 6,292,672 B1 | * | 9/2001 | Chavez, Jr. | 455/519 |
| 6,363,255 B1 | * | 3/2002 | Kuwahara | 455/456 |
| 6,542,716 B1 | * | 4/2003 | Dent et al. | 455/13.1 |

FOREIGN PATENT DOCUMENTS

| | | |
|---|---|---|
| JP | 04249925 | 9/1992 |
| JP | 09182137 | 7/1997 |
| JP | 09261717 | 10/1997 |

* cited by examiner

*Primary Examiner*—Charles Appiah
*Assistant Examiner*—Naghmeh Mehrpour
(74) *Attorney, Agent, or Firm*—Katten Muchin Zavis Rosenman

(57) ABSTRACT

The present invention relates to a method of registering a location in a mobile communication system in which the call signal traffic can be further reduced without increasing the location registration signal traffic. When a base station ID defined by notification information changes, or when a predetermined period of time has passed, the base station ID is stored in the history of the mobile device. From the latest history of the mobile device, one or a plurality of base stations near which the mobile device has a possibility of passing by next are statistically predicted. The predicted base stations are then stored as a personal location registration area. Based on the history, the registered personal location registration area is extracted so as to perform a location registration operation. Accordingly, the location registration operation can be performed with the optimum personal location registration area for the movement pattern of each mobile device. Thus, the call signal traffic can be reduced further without increasing the location registration signal traffic.

7 Claims, 14 Drawing Sheets

FIG.7

| ELEMENT | BASE STATION ID | DETECTION DATE (DAY OF THE WEEK) |
|---|---|---|
| 1 | BS23 | 8/23(MONDAY) 8:00 |
| 2 | BS34 | 8/23(MONDAY) 8:03 |
| 3 | BS35 | 8/23(MONDAY) 8:07 |
| 4 | BS36 | 8/23(MONDAY) 8:12 |
| 5 | BS37 | 8/23(MONDAY) 8:20 |
| 6 | BS38 | 8/23(MONDAY) 8:25 |
| 7 | BS48 | 8/23(MONDAY) 8:28 |
| 8 | BS49 | 8/23(MONDAY) 8:30 |
| 9 | BS60 | 8/23(MONDAY) 8:35 |
| 10 | BS60 | 8/23(MONDAY) 8:40 |
| ⋮ | ⋮ | ⋮ |
| m | BS60 | 8/23(MONDAY) 17:30 |
| m+1 | BS49 | 8/23(MONDAI) 17:37 |
| m+2 | BS48 | 8/23(MONDAY) 17:42 |
| m+3 | BS38 | 8/23(MONDAY) 17:48 |
| m+4 | BS37 | 8/23(MONDAY) 17:51 |
| m+5 | BS36 | 8/23(MONDAY) 18:01 |
| | | |
| | | |
| | | |

FIG.8

| ENTRY BASE STATION DETECTION PATTERN | | STRUCTURE BASE STATION ID INFORMATION (PERSONAL LOCATION REGISTRATION AREA) |
|---|---|---|
| BS23 | BS34 | BS35,BS36,BS37 |
| BS36 | BS37 | BS38,BS48,BS49 |
| BS60 | BS60 | BS60 |
| BS60 | BS60 | BS49,BS48,BS38,BS37 |
| | | |
| | | |

METHOD OF REGISTERING LOCATION IN MOBILE COMMUNICATION SYSTEM AND MOBILE DEVICE USED IN SAID METHOD

BACKGROUND OF THE INVENTION

1. Field of the Invention

The present invention generally relates to methods of registering the locations of mobile communication systems, and, more particularly, to a method of registering the location in a mobile communication system that registers the location of each mobile device. The present invention also relates to the mobile device.

2. Description of the Related Art

A mobile communication system comprises a plurality of base stations, and a mobile device connected to a mobile switching center via the base stations, thereby establishing a connection with another mobile device or a fixed device. To call a mobile device, the mobile switching center needs to grasp where the mobile device is located, i.e., near which base station the mobile device is located.

Conventionally, a location area (or a network fixed location registration area) LAi is allocated to each group of base stations, as shown in FIG. 1. In this figure, each small circle represents the area of a base station, and each large circle represents a location area. In this case, only when a mobile device moves from one location area to another, the mobile device transmits a location registration signal to the mobile switching center, thereby performing a location registration operation. The mobile switching center manages the location of the mobile device in each location area LAi. When the mobile device receives a call, a simultaneous call operation is performed on all the base stations corresponding to the location area LAi in which the location of the mobile device is registered.

The information of each location area LAi is incorporated in notification information that is constantly sent from the base stations. The mobile device compares its location area LAi with the location area LAi defined by the notification information. If the location area LAi of the mobile device does not coincide with the location area LAi, the mobile device transmits a location registration signal so as to perform a location registration operation. The mobile switching center manages the information of each mobile device, including the current location (i.e., the location area LAi). The information is managed by a HLR (Home Location Register) or a VLR (Visitor Location Register). When the mobile device receives a call, the mobile switching center refers to the HLR or VLR, and reads out the location area LAi corresponding to the mobile device. All the base stations (BSj) corresponding to the location area LAi then simultaneously call the mobile device.

If each location area LAi is made smaller, the call signal traffic can be made smaller accordingly, but the location registration signal traffic is increased. If each location area LAi is made larger, the location registration signal traffic can be made smaller, but the call signal traffic is increased. Therefore, in a mobile communication network, the size of each location area LAi (or the number of base stations) is determined in such a manner as to optimize the balance between the location registration signal traffic and the call signal traffic.

To reduce the location registration signal traffic and the call signal traffic, various suggestions have been made. In a case where a mobile device moves in the vicinity of the boundary of a location area LAi, to prevent an increase in location registration signal traffic, the location area has a hierarchical structure. More specifically, a first-layer location area and a second-layer location area have different boundaries from each other. If the location of a mobile device changes in the first-layer location area LAi, the location is registered in the second-layer location area, thereby giving hysteresis to the location registration operation.

For a mobile device having a high motion frequency and a small call reception frequency, a location registration operation is performed with a location area LAi that extends in a wide area. On the other hand, for a mobile device having a low motion frequency and a high call reception frequency, a location registration operation is performed with a location area LAi that extends only in a narrow area, thereby reducing the location registration signal traffic and the call signal traffic. However, those location areas LAi are selected from predetermined ones on the network side, resulting in unnecessary call signal traffic.

Generally, a person's sphere of action is limited. For some people, a location registration operation is performed between their houses and workplaces. For others, a location registration operation is performed only in the vicinity of their houses. In this case, the location registration operation in the location registration area shown in FIG. 1 results in unnecessarily large call signal traffic. In order to avoid such unnecessary call signal traffic, the following suggestions have been made.

Japanese Laid-Open Patent Application No. 8-84364 discloses a mobile switching center call system in a cellular phone network. As shown in FIG. 2, in a case where a mobile device frequently moves between two location registration areas MLA1 and MLA2, it is necessary to restrict the location registration signal traffic that increases every time the location registration areas are changed. In the mobile switching center call system, the following operation is performed. A plurality of base stations near which the mobile device has a high probability of being located are determined in advance, in accordance with the tendency of call transmission and reception of the mobile device. The plurality of base stations are then registered as a virtual mobile location area VMLA that is inherent to the mobile device, thereby preventing a location registration operation even when the mobile device moves within the location registration areas MLA1 or MLA2. The base stations in the virtual mobile location area VMLA are a first call group, the base stations in the rest of the location registration area MLA1 are a second call group, and the base stations in the rest of the location registration area MLA2 are a third call group. When the mobile device receives a call, the first call group, the second call group, and the third call group are called in this order.

Japanese Laid-Open Patent Application No. 9-116952 discloses a mobile communication system in which a location registration area is formed within each user's sphere of action, as shown in FIG. 3. When the mobile device is located within the location registration area, a location registration operation is not performed, thereby reducing the location registration signal traffic. The mobile device counts the number of base stations near which the mobile device passes, and notifies the network of the result, if necessary. The mobile device notifies the mobile switching center of which base stations the mobile device frequently passes near and stays over a long period of time.

The mobile switching center stores the base stations notified from the mobile device. When the mobile device receives a call, the mobile switching center carries out a simultaneous call operation on all the registered base stations for the mobile device. Also, depending on the passing count number and the duration of stay, the base stations are grouped in the descending order of probability of having the mobile device staying therein. In FIG. 3, the staying probability of the mobile device is the highest at the base stations with black solid circles, the second highest at the base stations with double circles, and the lowest at the base stations with single circles. When the mobile device receives a call, the mobile switching center first calls the base stations with the black solid circles. If the mobile switching center cannot detect the mobile device, the mobile switching center calls the base stations with the double circles for the mobile device. If the mobile device cannot be found yet, the mobile switching center calls the group of base stations with the single circles. If the mobile device moves outside the shaded area, which represents the location registration area of the mobile device in FIG. 3, the mobile device can detect the base station ID notified from the base station. Accordingly, the mobile device can compare the notified base station ID with base station IDs stored in the mobile device (represented by the shaded areas). By doing so, the mobile device recognizes that the mobile device has moved out of its own location registration area, and then registers the normal location registration area as shown in FIG. 1.

Japanese Laid-Open Patent Application No. 10-303530 discloses a mobile communication system in which each mobile terminal manages the location detection history, and base stations at which base station switching often occurs are grouped into personal location registration areas in accordance with the motion characteristics of each terminal, as shown in FIG. 4. In this system, the location registration signal traffic and the call signal traffic are reduced.

Japanese Laid-Open Patent Application No. 5-336026 discloses a mobile communication system in which a location registration area into which a mobile device enters next is estimated from the moving direction and the moving speed of the mobile device. In this system, a location registration operation is performed in a location registration zone that is long in the moving direction and short in the direction vertical to the moving direction, so that the location registration signal traffic and the call signal traffic are reduced.

In the system disclosed in Japanese Laid-Open Patent Application No. 8-84364, however, when the motion range becomes too wide, or the location registration area becomes too wide with microcells, the paging signal traffic is increased with a large virtual mobile location area VMLA. Also, with a small virtual mobile location area VMLA, the probability that the mobile device can be called in the small virtual mobile location area VMLA becomes low. Furthermore, the sequential call operation might take time to reach the mobile device, resulting in large signal traffic.

In the system disclosed in Japanese Laid-Open Patent Application No. 9-116952, the base stations in the location registration area of a mobile device are called in the descending order of probability of having the mobile device therein. This system is effective as long as there is a large difference in the probabilities. However, if all the base stations has similar probabilities, this system does not work very effectively. Also, if the mobile device is located at the base station to be called last, it takes a long time until the mobile device actually receives a call. In such a case, the call signal traffic also increases.

In the system disclosed in Japanese Laid-Open Patent Application No. 10-303530, a location registration area is formed for each user, and the location registration signal traffic and the call signal traffic can be reduced. However, when the mobile device is stationary, a location registration operation is performed on a plurality of base stations. As a result, the plurality of base stations are called when the mobile device is to receive a call. This calling signal traffic can be reduced by reducing the number of base stations registered in the stationary state. For instance, the call signal traffic can be reduced to a third by reducing the number of base stations to one. This means that this system has the problem of unnecessarily traffic.

In the technique disclosed in Japanese Laid-Open Patent Application No. 5-336026, each mobile device needs to have a function of detecting the motion speed and direction. If no detectors for detecting the motion speed and direction are provided, the motion speed and direction can be calculated from the coordinates of the latest base station that has received a call. However, the motion speed and direction cannot be very accurately determined in this system. Therefore, it is necessary to mount a detector for detecting the motion speed and direction on the mobile device, resulting in high costs.

SUMMARY OF THE INVENTION

A general object of the present invention is to provide methods of registering locations in a mobile communication system and mobile devices in which the above disadvantages are eliminated.

A more specific object of the present invention is to provide a method of registering a location in a mobile communication system and a mobile device used in the system that can reduce a call signal traffic without increasing the location registration signal traffic.

The above objects of the present invention are achieved by a method of registering a location in a mobile communication system in which one or a plurality of base stations are connected to a mobile switching center that manages a location of a mobile device in accordance with a location registration from the mobile device, and in which a simultaneous call connection is performed on the registered one or plurality of base stations when the mobile device receives a call. This method comprises the steps of:

transmitting a base station ID for identifying each base station from each corresponding base station, the base station ID being incorporated into notification information;

storing the base station ID as a history of the mobile device when the base station ID indicated by the notification information changes, or when a predetermined period of time has passed;

statistically predicting one or a plurality of base stations near which the mobile device will pass by next, in accordance with the latest history of the mobile device;

registering the predicted one or plurality of base stations as a personal location registration area; and extracting the registered personal location registration area based on the history of the mobile device, thereby performing a location registration operation.

By this method, a location registration operation can be performed with the optimum personal location registration area for each mobile device. Thus, the call signal traffic can be further reduced without increasing the location registration signal traffic.

The above objects of the present invention are also achieved by a mobile device in which one or a plurality of base stations are connected to a mobile switching center that manages a location of the mobile device in accordance with a location registration from the mobile device, and in which a simultaneous call connection on the registered one or plurality of base stations is carried out when the mobile device receives a call. This mobile device comprises:

- a base station ID detection unit that detects a base station ID that identifies each base station, the base station ID being incorporated in notification information supplied from each corresponding base station;
- a reception base station ID storage unit that stores the base station ID as a history of the mobile device, when the base station ID indicated by the notification information changes, or when a predetermined period of time has passed;
- a predicted location registration unit that statistically predicts one or a plurality of base stations near which the mobile device will pass by next, in accordance with a latest history of the mobile device stored in the reception base station ID storage unit, and registers the predicted one or plurality of base stations as a personal location registration area; and
- a location registration unit that extracts the personal location registration area registered in the predicted location registration unit, base on the history of the mobile device stored in the reception base station ID storage unit.

With this mobile device, a location registration operation can be performed with the optimum personal location registration area for each mobile device. Thus, the call signal traffic can be further reduced without increasing the location registration signal traffic.

The above and other objects and features of the present invention will become more apparent from the following description taken in conjunction with the accompanying drawings.

BRIEF DESCRIPTION OF THE DRAWINGS

FIG. 7 shows one embodiment of information stored in a reception base station ID storage unit shown in FIG. 6;

FIG. 8 shows one embodiment of information stored in a personal location registration area constituent information registration unit shown in FIG. 6;

DESCRIPTION OF THE PREFERRED EMBODIMENTS

The following is a description of embodiments of the present invention, with reference to the accompanying drawings.

Figure 1:
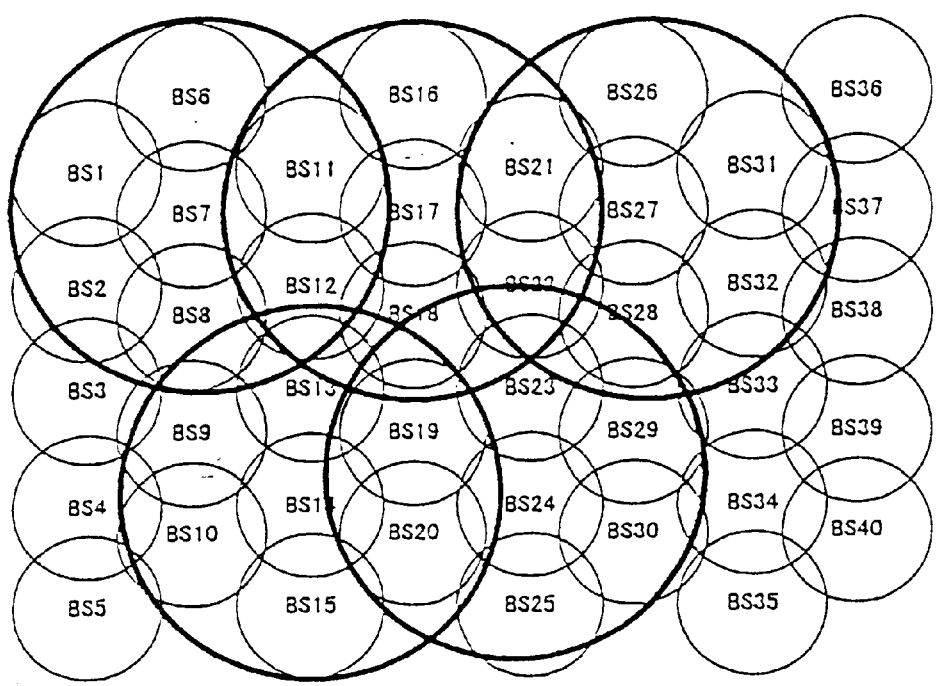
FIG. 1 illustrates a conventional location registration method of a mobile device.
Figure 2:
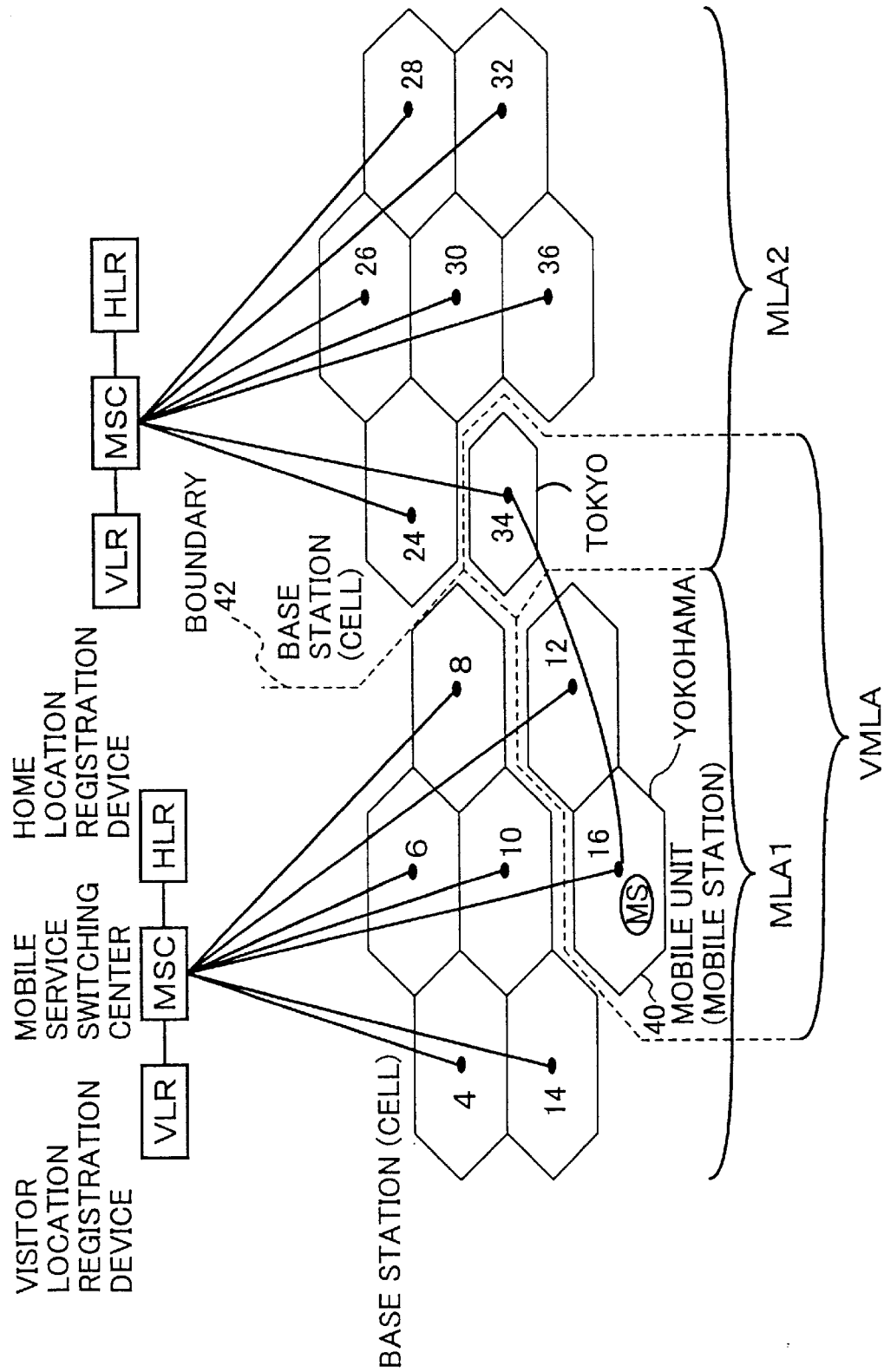
FIG. 2 illustrates a conventional location registration method of a mobile device.
Figure 3:
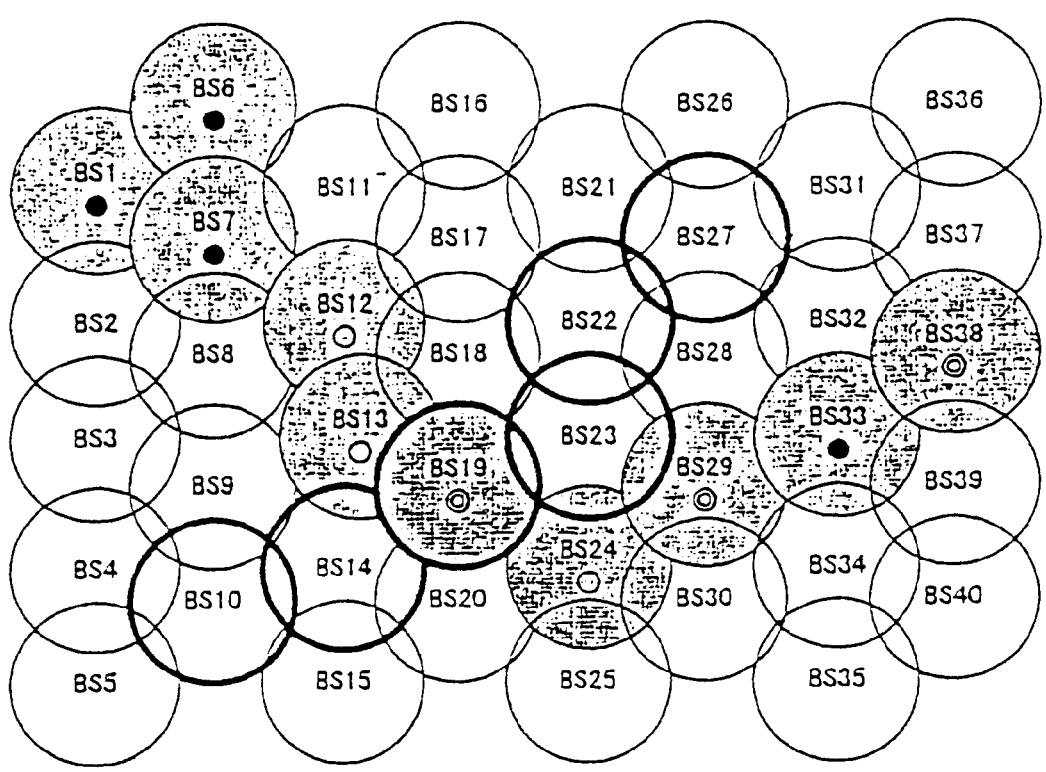
FIG. 3 illustrates a conventional location registration method of a mobile device.
Figure 4:
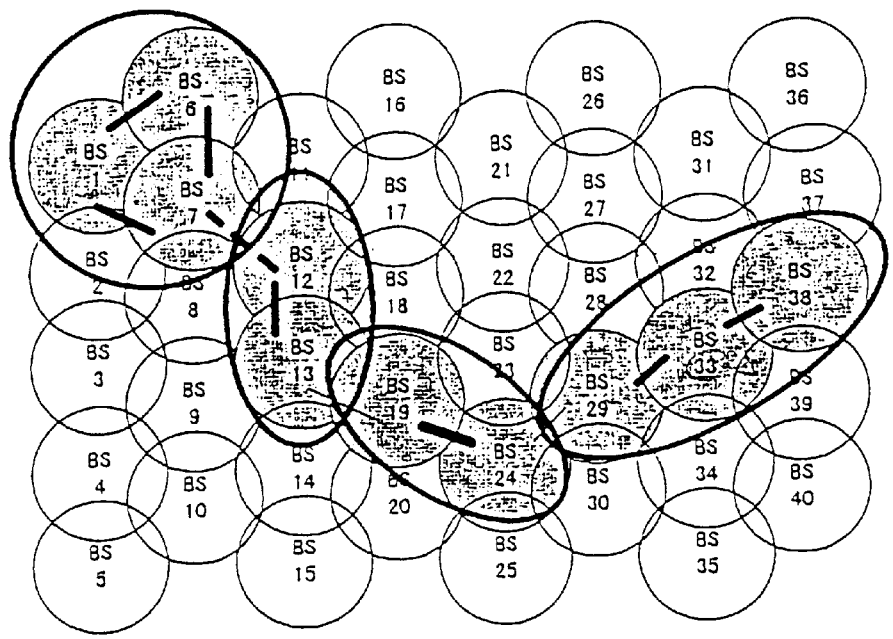
FIG. 4 illustrates a conventional location registration method of a mobile device.
Figure 5:
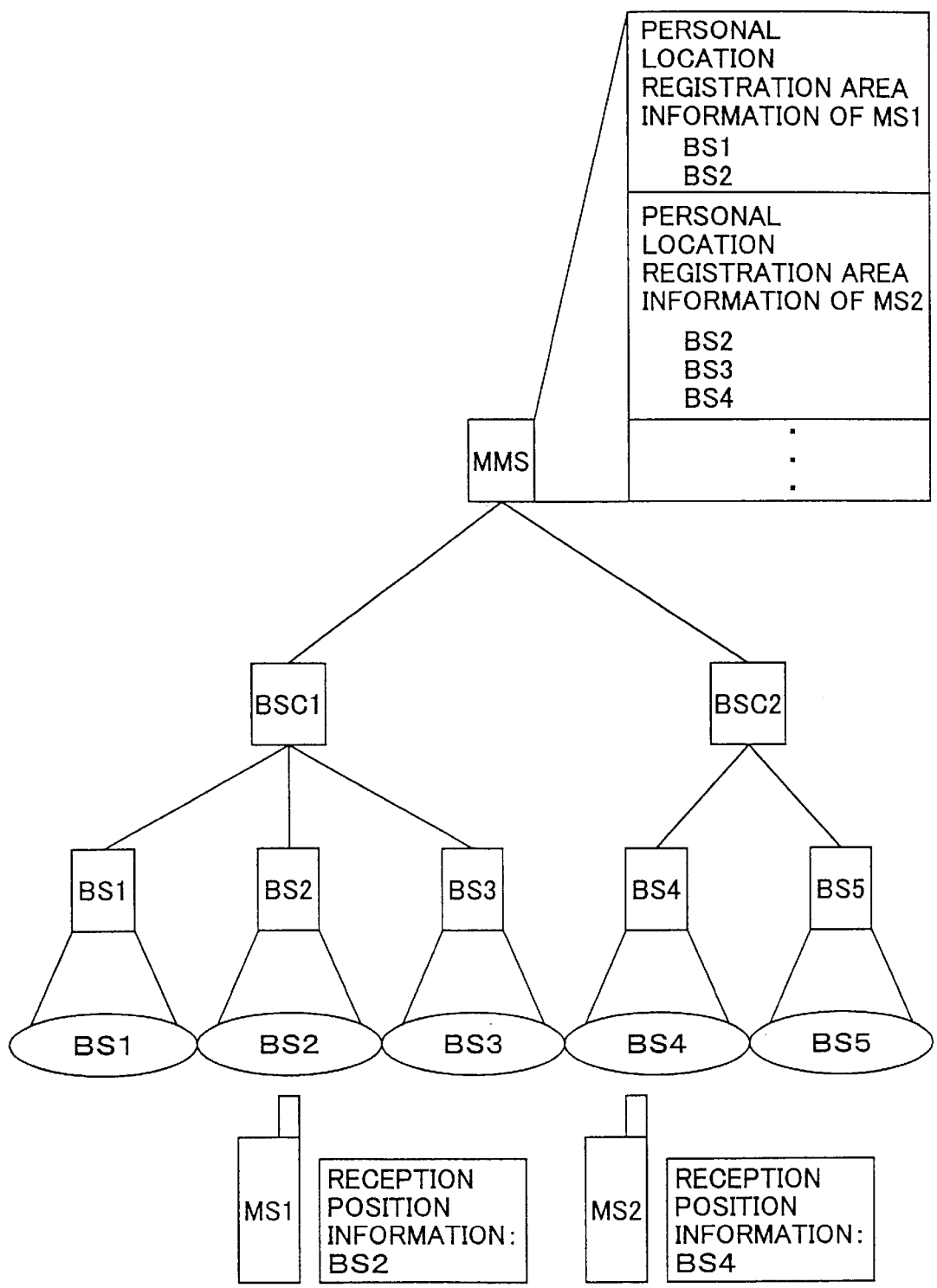
FIG. 5 shows the system structure of one embodiment of a communication system to which the present invention is applied.

FIG. 5 shows the structure of one embodiment of a communication system to which the present invention is applied. In this figure, BS1 to BS5 indicate base stations. A base station control device BSC1 controls the selection, synthesizing, and handover of radio signals for the base stations BS1 to BS3, while a base station control device BSC2 controls the selection, synthesizing, and handover of radio signals for the base stations BS4 and BS5. A mobile switching center MMS controls the base station control devices BSC1 and BSC2, and is connected to another switching center via a communication network. Mobile devices MS1 and MS2 store the information of the base stations registered by each mobile device. For instance, the mobile device MS1 stores the information of the base stations BS1 and BS2, while the mobile device MS2 stores the information of the base stations BS2, BS3, and BS4.

The mobile switching device MMS stores the group of base stations currently registered by each mobile device. That is, the mobile switching device MMS stores a personal location registration area or a network fixed location registration area. The personal location registration area is a location registration area that contains one or a plurality of base stations, and the network fixed location area is a location registration area containing fixed groups of base stations in the network.

The base stations BS1 and BS2 are allocated to the mobile device MS1, while the base stations BS2, BS3, and BS4 are allocated to the mobile device MS2. The mobile switching center MMS stores the groups of base stations in accordance with a location registration request from the mobile devices. When a mobile device receives a call, the mobile switching center MMS simultaneously calls all the registered base stations for the mobile device.

Figure 6:
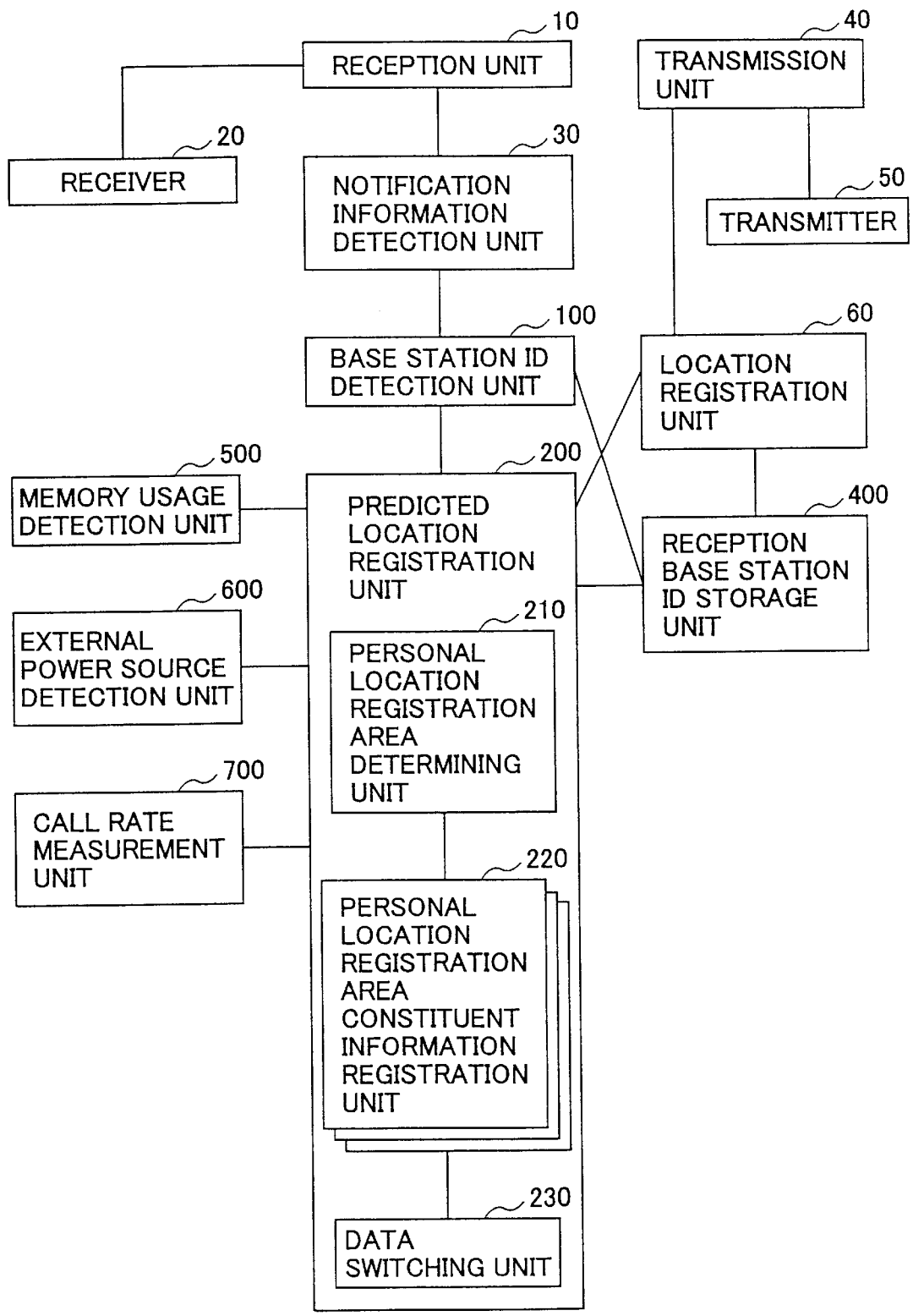
FIG. 6 is a block diagram of one embodiment of a mobile device in accordance with the present invention.

FIG. 6 is a block diagram of one embodiment of a mobile device of the present invention. In this figure, a reception unit 10 receives a signal from a base station, and a receiver 20 outputs the audio signal contained in the reception signal. A notification information detection unit 30 detects the notification information contained in the reception signal, and supplies the notification information to a base station ID detection unit 100. The base station ID detection unit 100 detects the base station ID contained in the notification information from the base station. When the base station ID detection unit 100 detects a change of the base station IDs, a reception base station ID storage unit 400 accumulates the base station IDs and the reception times. Examples of information stored in the reception base station ID storage unit 400 are shown in FIG. 7.

A location registration unit 60 registers the location of each base station by the base station ID. Accordingly, the location registration unit 60 transmits a location registration signal to the base station by a transmission unit 40. The transmission unit 40 transmits the audio signal from a transmitter 50 to the base station. A predicted location registration unit 200 determines the optimum location registration area that can be estimated from a base station detection pattern for the mobile device, based on the history stored in the reception base station ID storage unit 400. The predicted location registration unit 200 sends a location registration request to the location registration unit 60.

A personal location registration area determining unit 210 extracts the motion characteristics that are inherent to the mobile device based on the information stored in the reception base station ID storage unit 400. The personal location registration area determining unit 210 statistically extracts a base station detection pattern and a base station ID that has a high probability of containing the mobile device after the base station pattern detection. The extracted base station detection pattern and the base station ID are stored in personal location registration area constituent information registration units 220. Each of the personal location registration area constituent information registration units 220 is a table that stores a mobile device base station detection pattern (a group of detected base stations) and a location registration area predicted from the base station detection pattern. Examples of information stored in the personal location registration area constituent information registration units 220 are shown in FIG. 8.

A call reception frequency measuring unit 700 measures a call reception frequency at each mobile device. When the call reception frequency is high, the call reception frequency measuring unit 700 sets only a small number of base stations that constitute the personal location registration area. On the other hand, when the call reception frequency is low, the call reception frequency measuring unit 700 sets a large number of base stations that constitute the personal location registration area.

A memory usage detection unit 500 determines whether or not the memory usage exceeds a threshold value of the reception base station ID storage unit 400. If the memory usage exceeds the threshold value, the memory usage detection unit 500 activates the personal location registration area determining unit 210, and, in accordance with the information stored in the reception base station ID storage unit 400, registers the personal location registration area in the personal location registration area constituent information registration units 220.

A date switching unit 230 validates the information corresponding to the current date in the personal location registration area constituent information registration units 220, so that the personal location registration area can be determined based on the information at the time of location registration. An external power source detection unit 600 detects the connection between a mobile device and an external power source such as a recharger. By doing so, the external power source detection unit 600 activates the personal location registration area determining unit 210, and, in accordance with the data stored in the reception base station ID storage unit 400, one of the personal location registration area constituent information registration units 220 is selected. The call reception frequency measuring unit 700 measures the frequency rate of the mobile device.

The base station ID detection unit 100 always receives notification information from the base stations. The notification information contains base station IDs for identifying the base stations. The base station ID detection unit 100 accumulates reception base station IDs and the reception times in the reception base station ID storage unit 400, as shown in FIG. 7. When location registration is necessary, the mobile device determines the optimum location registration area (a group of base stations) predicted from the last base station detection pattern, based on the data accumulated in the reception base station ID storage unit 400, thereby performing a location registration operation.

The trigger of location registration is the point in time where the base station ID received by the mobile device becomes unequal to one or a plurality of registered base stations, or the regular timing of location registration. When the mobile device moves in accordance with a pattern, the number of registered base stations can be reduced, thereby reducing the traffic for calling.

Figure 9:
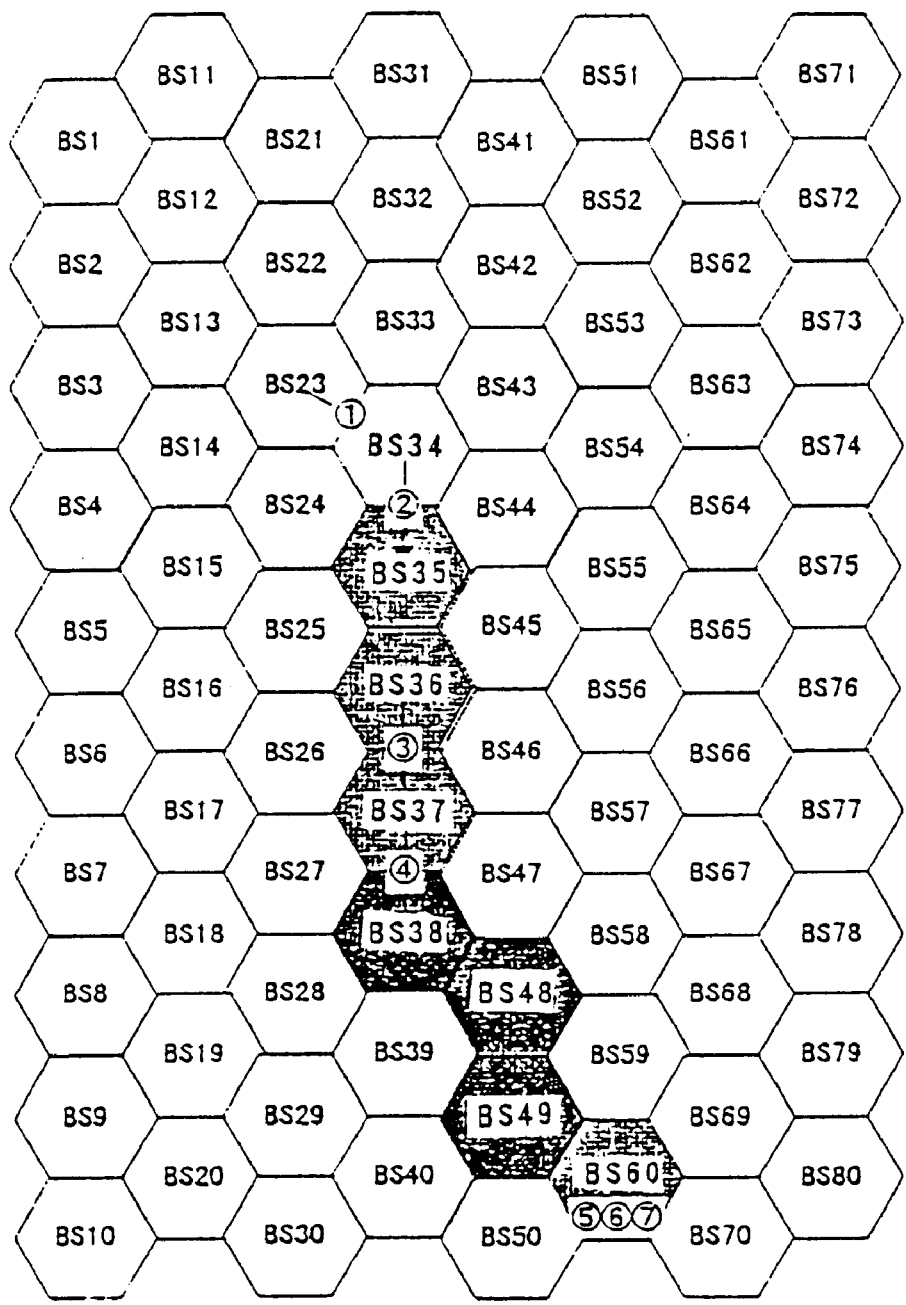
FIG. 9 illustrates a location registration operation in accordance with the present invention.

The above location registering operation is shown in FIG. 9. In this figure, when the mobile device moves from a location ①, to a location ②, the detected base station ID changes from BS23 to BS34 to BS35. The mobile device performs a location registration operation on BS35, BS36, and BS37, in that order, because it is apparent from the past history shown in FIG. 7 that the probability of detecting BS35, BS36, and BS37 is high. When the mobile device moves from BS35 to BS36 to BS37, and detects BS38, the mobile device recognizes that it moves out of the group of base stations registered in the network, and then starts performing a location registration operation.

Since the last base station detection pattern starts from BS36 to BS37 to BS38 (the movement from ③ to ④), the mobile device performs a location registration operation on BS38, BS48, and BS49 predicted from the base station detection pattern. As is apparent from the past history shown in FIG. 7, there is a high probability that the mobile station next stops at BS60. Accordingly, a location registration operation is performed on BS60. If it is predicted from the movement from ③ to ④ that the area includes BS60 as well as BS38, BS48, and BS49, a location registration operation is no longer continued after the mobile device enters BS60. Accordingly, a simultaneous call operation is performed on BS38, BS48, and BS49 for a while.

If the mobile station stays at BS60, a location registration operation is performed only on BS60 by a regular position registration operation, thereby lowering the call signal traffic. During the movement, it is possible not only to pinpoint the location registration area from the movement characteristics but also to narrow down the location registration base stations to one at the minimum.

The personal location registration area determining unit 210 determines the last base station detection pattern and the combination of base stations having high probabilities of being detected after the detection of the previous base station detection pattern. The personal location registration area determining unit 210 stores the results in the personal location registration area constituent information registration units 220. When the reception base station ID does not coincide with the currently registered base station information, or when a timeout occurs in a regular position registration timer, the predicted location registration unit 200 retrieves a pattern that matches the last history of the mobile device from the personal location registration area constituent information registration units 220. If there is a matching pattern, a location registration operation is performed on a corresponding personal location registration area (having the base station ID of one of the lines in FIG. 8). If there is no matching pattern, a location registration operation is performed on the network fixed location registration area.

The call rate is measured by counting the number of calls at the mobile device. If the call rate is high, the personal location registration area is determined in such a manner that the number of base stations that constitute the personal location registration area becomes large. If the call rate is low, the personal location registration area is determined in such a manner that the number of base stations that constitute the personal location registration area becomes small. Thus, the location registration signal traffic and call signal traffic can be reduced.

Also, since the personal location registration area constituent information registration units 220 are constructed for each day of the week, it is possible to reduce the location registration signal traffic and call signal traffic of a mobile device that has a different operation pattern each day of the week.

The external power source detection unit 600 detects a power source externally supplied from a recharger or the like. When the external power source detection unit 600 detects that an external power source is supplied, the external power source detection unit 600 activates the personal position registration area determining unit 210. By doing so, the personal location registration area determining unit 210 that requires arithmetic operations can be operated while an external power source is supplied. Thus, exhaustion of battery can be restricted.

The memory usage detection unit 500 determines the usage of the memory used by the reception base station ID storage unit 400. If the usage of the memory exceeds a threshold value, the memory usage detection unit 500 determines that the reception base station information cannot be accumulated any more, and activates the personal location registration area determining unit 210. The personal location registration area determining unit 210 constructs personal location registration area constituent information, and then clears the memory area used by the reception base station ID storage unit 400. By doing so, it becomes possible to construct a personal location registration area constituent information registration unit 220 that is effective with a limited memory amount.

Figure 10:
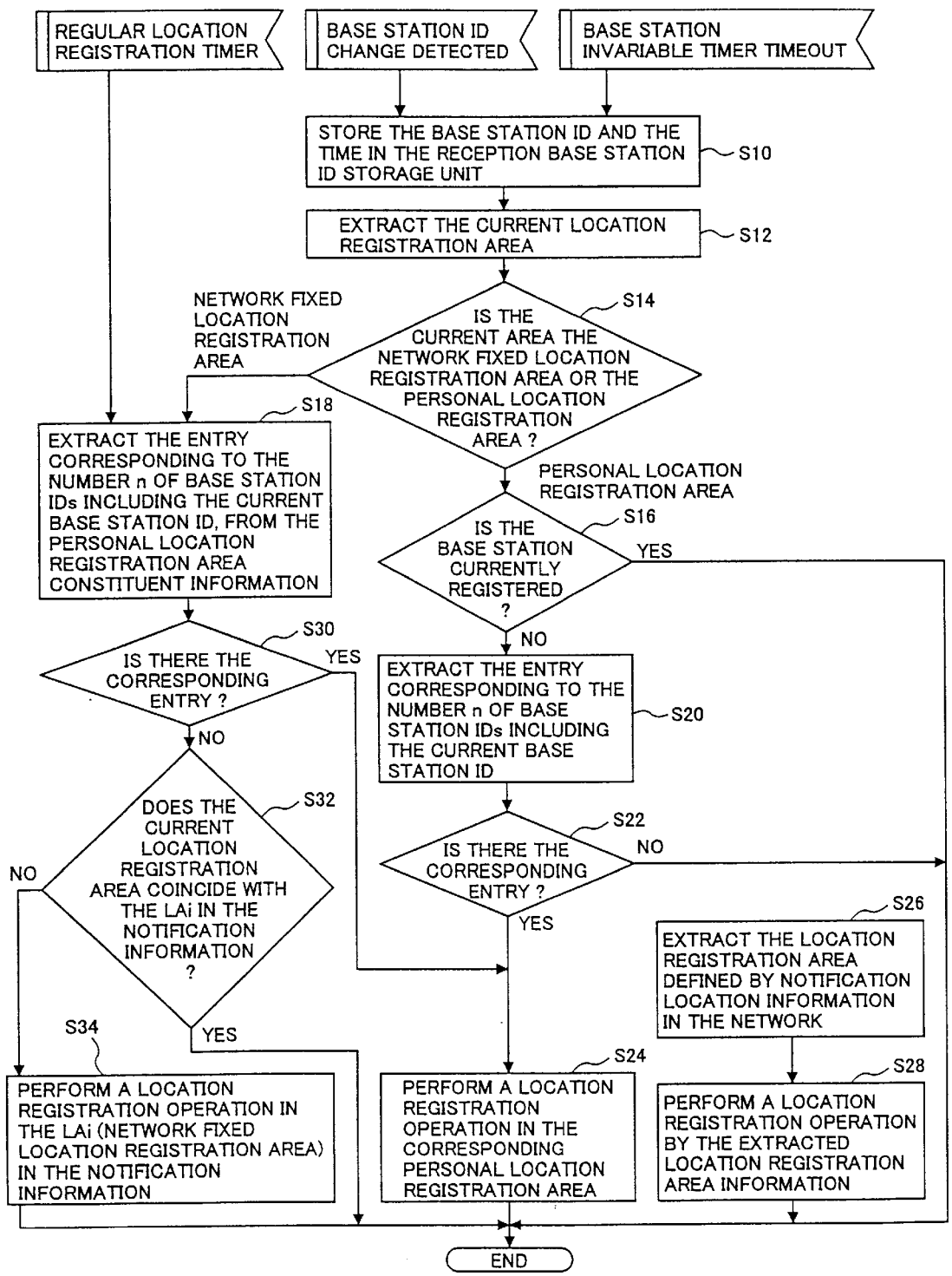
FIG. 10 is a flowchart of a location registration operation performed by a location registration unit shown in FIG. 6.

FIG. 10 is a flowchart of a location registration operation performed by a location registration unit 60 when the mobile device detects a change of base station IDs or performs a regular location registration operation, or when the base stations do not change. When the mobile device detects a change of base station IDs, or when a predetermined period of time has passed after the base station ID stops changing, the location registration unit 60 starts the operation in step S10 while the timer is in a timeout state.

In step S10, the base station ID and the time are stored in the reception base station ID storage unit 400. In step S12, a current location registration area registered in the location registration unit 60 is extracted. Here, either the network fixed location registration area or the personal location registration area, and base stations that are currently registered, are extracted. In step S14, it is determined whether the current location registration area is the personal location registration area or the network fixed location registration area. If it is determined to be the personal location registration area, the operation moves on to step S16. If it is determined to be the network fixed location registration area, the operation moves on to step S18.

If the current location registration area is the personal location registration area, it is determined, in step S16, whether or not the reception base station ID is the ID of a base station that is currently registered. If it is the ID of a currently registered base station, the operation comes to an end. If it is not the ID of a currently registered base station, the operation moves on to step S20, in which the latest n (n=3, for instance) reception base station IDs including the current reception base station ID stored in the reception base station ID storage unit 400 shown in FIG. 7 are read out, and the entry corresponding to the three reception base station ID are extracted from the personal location registration area constituent information shown in FIG. 8.

In step S22, it is determined whether or not the entry corresponding to the personal location registration area constituent information has been extracted. If the corresponding entry has been extracted, the operation moves on to step S24, in which the personal location registration area of the extracted entry is stored in the location registration unit 60, and a notification is sent from the transmission unit 40 to the mobile switching center MMS so as to carry out a location registration operation. The operation then comes to an end. If the corresponding entry has not been extracted, the operation moves on to step S26, in which the location registration area defined by notification information is extracted from the network. In step S28, the extracted location registration area, i.e., the network fixed location registration area, is held in the location registration unit 60, and a notification is sent from the transmission unit 40 to the mobile switching center MMS so as to carry out the location registration operation. The operation then comes to an end.

Meanwhile, if the current location registration area is the network fixed location registration area, the operation moves on to step S18. Also, when the regular location registration timer is in the state of timeout, the operation starts from step S18. In step S18, the latest n (n=3, for instance) reception base station IDs including the current (the latest) reception base station ID stored in the reception base station ID storage unit 400 shown in FIG. 7 are read out, and the entry corresponding to the three reception base station IDs is extracted from the personal location registration area constituent information shown in FIG. 8.

In step S30, it is determined whether or not the corresponding entry has been extracted, i.e., whether or not the corresponding entry is included in the personal location registration area constituent information. If the corresponding entry has been extracted, the personal location registration area of the entry extracted in step S24 is held in the location registration unit 60, and a notification is sent from the transmission unit 40 to the mobile switching center MMS, thereby performing a location registration operation. The operation then comes to an end. If the corresponding entry has not been extracted, the operation moves on to step S32. In step S32, it is determined whether or not the current location registration area extracted from the location registration unit 60 coincides with the location registration area defined in the network by the notification location information. If it coincides with the location registration area defined by the notification location information, the operation comes to an end. If it does not coincide with the location registration area defined by the notification location information, the operation moves on to step S34. In step S34, the location registration area extracted from the notification location information, i.e., the network fixed location registration area, is held in the location registration unit 60, and a notification is sent from the transmission unit 40 to the mobile switching center MMS, thereby performing a location registration operation. The operation then comes to an end.

Other than the case where a change of base station IDs is detected, when the above location registration operation is performed at the timeout of a base station invariable timer or at the timeout of a regular location registration timer, for example, when the mobile device stays at BS60 for a while, it is possible to register only at BS60 as shown in the third line of the personal location registration area information shown in FIG. 8. Using the personal location registration area constituent information, the call operation is performed only on the single base station BS60. Thus, the call signal traffic can be minimized.

The personal location registration area constituent information registration units 220 can be produced for each day of the week, so that the optimum location registration operation can be provided for users who have different patterns of action by the day of the week. At the time of location registration, the day of the week is extracted, and the group of base stations are then extracted from the personal location registration area constituent information registration unit 220 corresponding to the extracted day of the week. Thus, the optimum location registration operation can be performed. Although the number n of base stations in the base station detection pattern is 3 in this embodiment, the number n may be 2, 4, or larger than 4.

Figure 11:
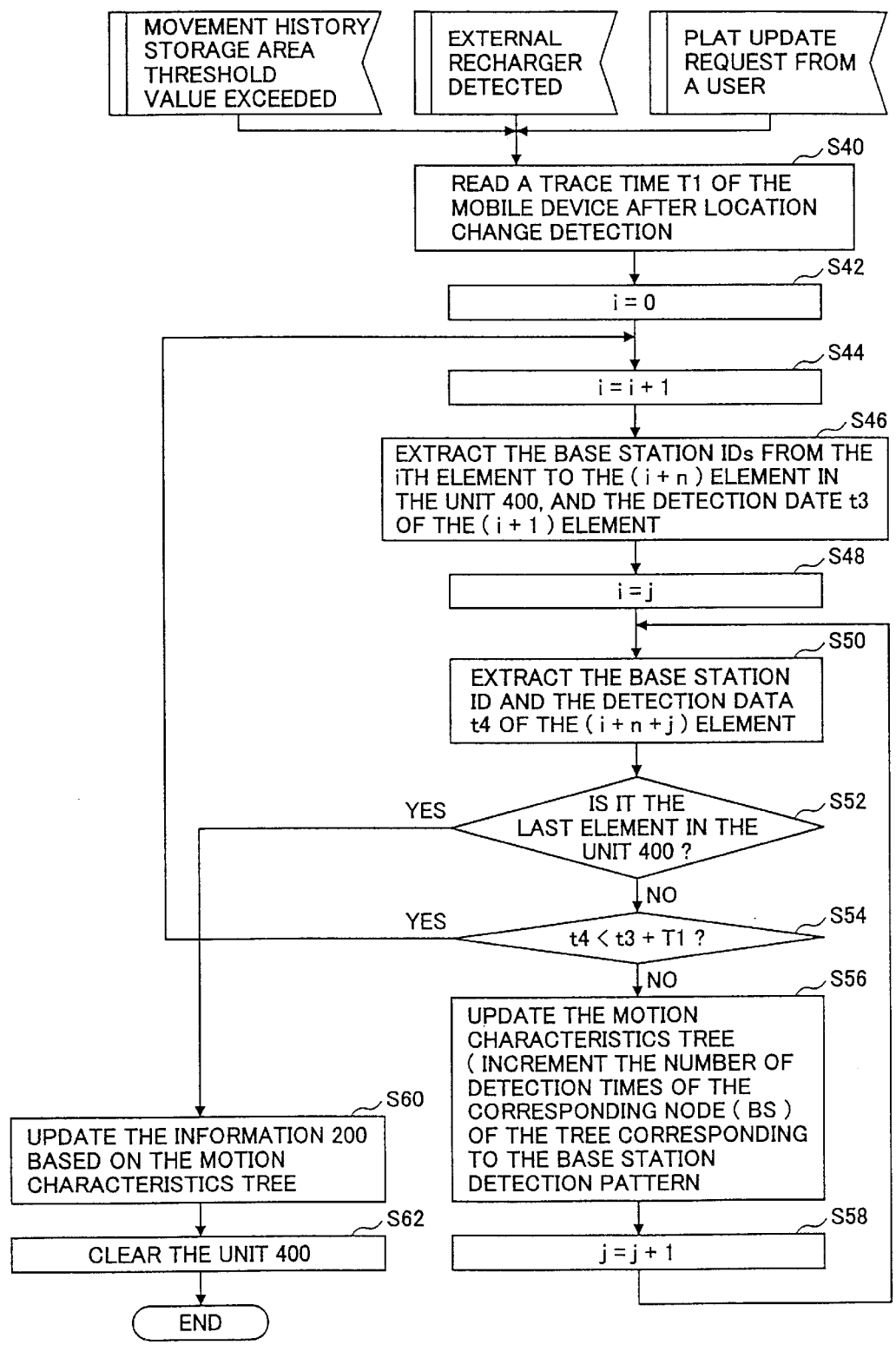
FIG. 11 is a flowchart of a personal registration area constituent information construction operation performed by a personal location registration area determining unit shown in FIG. 6.

FIG. 11 is a flowchart of a personal location registration area constituent information construction operation performed by the personal location registration area determining unit 210 when a request for updating the personal location registration area constituent information (PLAT) is made from a user, when the memory usage detection unit 500 indicates that the usage of the memory has exceeded the threshold value, and when the external power source detection unit 600 indicates that the power source is externally supplied. First, in step S40, a trace time T1 of the mobile device after the location change detection is read out from the location registration unit 60. In step S42, a pointer i is then set to "0".

In step S44, the pointer i is incremented by 1. In step S46, the base station IDs from the ith element to the (i+n)th element, and the detection date t3 of the (i+1)th element are extracted from the reception base station ID storage unit 400 shown in FIG. 7. In step S48, a pointer j is set to "1". In step S50, the base station ID and the detection date t4 of the (i+n+j)th element are extracted. In step S52, it is determined whether or not the (i+n+j)th element is the last element in the reception base station ID storage unit 400. If it is not, in step S54, it is determined whether or not the detection date t4 is earlier than the date determined by adding the trace time T1 to the detection date t3.

Figure 12:
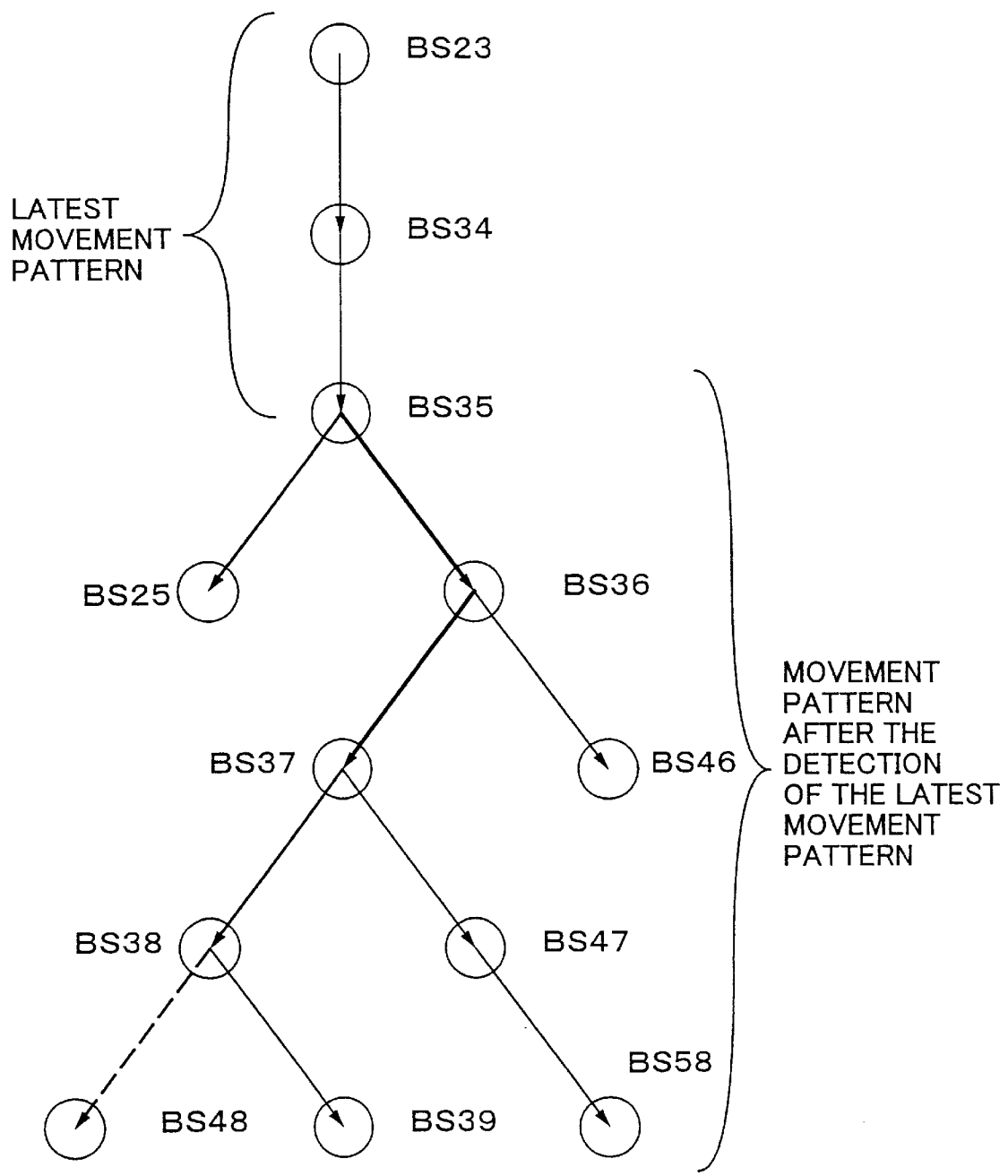
FIG. 12 shows a motion characteristics tree.

If the detection date t4 is earlier than the date determined by adding the trace time T1 to the detection date t3, the operation moves on to step S56, in which the motion characteristics tree is updated. Here, the number of detection times of the base station corresponding to the node corresponding to the base station detection pattern, i.e., to the base station ID of the (i+n+j)th element, is incremented. FIG. 12 shows the motion characteristics tree of a base station detected by the mobile device within a predetermined period of time after the mobile device has moved from BS23 to BS34 to BS35, as shown in FIG. 9. After the detection of the base station detection pattern (BS23 to BS34 to BS35), the number of detection times of BS36 to BS37 to BS38 indicated by the thickest arrows in FIG. 12 is the largest, and the number of detection times of BS25 (indicated by the second thickest arrow) is the second largest. On the other hand, the number of detection times of the other base stations (such as BS46 and BS47) indicated by the thin arrows is small. In step S56, however, the number of detection times of each base station in the motion characteristics tree shown in FIG. 12 is incremented. After step S56 is carried out, the operation moves on to step S58, in which the pointer j is incremented by 1. The operation then moves on to step S48.

The updating of the motion characteristics tree in step S56 is repeated by incrementing the pointer j, so long as the detection date t4 of the (i+n+j)th element is earlier than the date determine by adding the trace time T1 to the detection date t3. When the detection date t4 passes beyond the date obtained by adding the trace time T1 to the detection date t3, the operation returns from step S54 to step S44. The pointer i is incremented, and the above operation is repeated.

If the (i+n+j)th element is determined to be the last element in the reception base station ID storage unit 400 in step S52, the operation moves on to step S60. In the motion characteristics tree shown in FIG. 12, the base station ID of the base station (node) having a detection probability higher than a predetermined threshold value is extracted, and the personal location registration area constituent information registration unit 220 shown in FIG. 8 is updated. The detection probability of the base station can be determined by dividing the detection time of the base station by the detection times of all base stations.

Here, n base station IDs that constitute the last motion pattern in the motion characteristics tree shown in FIG. 12 are registered as an entry, and the extracted one or more base station IDs are registered as components in the personal location registration area. However, in a case where the number of base stations to be registered in the personal location registration area exceeds a predetermined maximum number of the constituent base stations, only the maximum number of constituent base stations are registered, in the descending order of detection probability, as the personal location registration area constituent information, and the rest of the base stations are not registered as constituents. After that, the operation moves on to step S62, in which the reception base station ID storage unit 400 shown in FIG. 7 is all cleared. The operation then comes to an end.

In the above manner, each personal location registration area constituent information registration unit 220 is constructed. In accordance with the reception frequency of the mobile device, the threshold value for the detection probability and the maximum number of constituent base stations are changed, so that the constituent information of the personal location registration area can be made smaller for a mobile device having a high call reception frequency, and that the constituent information of the personal location registration area can be made larger for a mobile device having a low call reception frequency.

The activation trigger of the personal location registration area determining unit 210 may be the time when the reception base station ID storage unit 400 exceeds a threshold value. In this case, the reception base station ID storage unit 400 can be prevented from overflowing. Also, the activation trigger of the personal location registration area determining unit 210 may be the time when the external power source detection unit 600 determines that the power is externally supplied. In this case, the exhaustion of the battery of the mobile device can be restricted. Other timeout methods may be used for the activation trigger of the personal location registration area determining unit 210. Thus, each personal location registration area constituent information registration unit 220 can be regularly updated.

As described above, FIG. 12 shows the motion characteristics tree of the base station detected by a mobile device within a predetermined period of time after the mobile device has moved from BS23 to BS34 to BS35. After the detection of the base station detection pattern (BS23 to BS34 to BS35), the number of detection times of BS36 to BS37 to BS38 indicated by the thickest arrows is the largest, and the number of detection times of BS25 indicated by the second thickest arrow is the second largest. On the other hand, the number of detection times of the other base stations (such as BS46 and BS47) indicated by the thin arrows is small. Accordingly, after the detection of BS23, BS34, and BS35 in this order, an area having a high probability of including the mobile station is determined to be BS36, BS37, BS38, and BS25.

Figure 13:
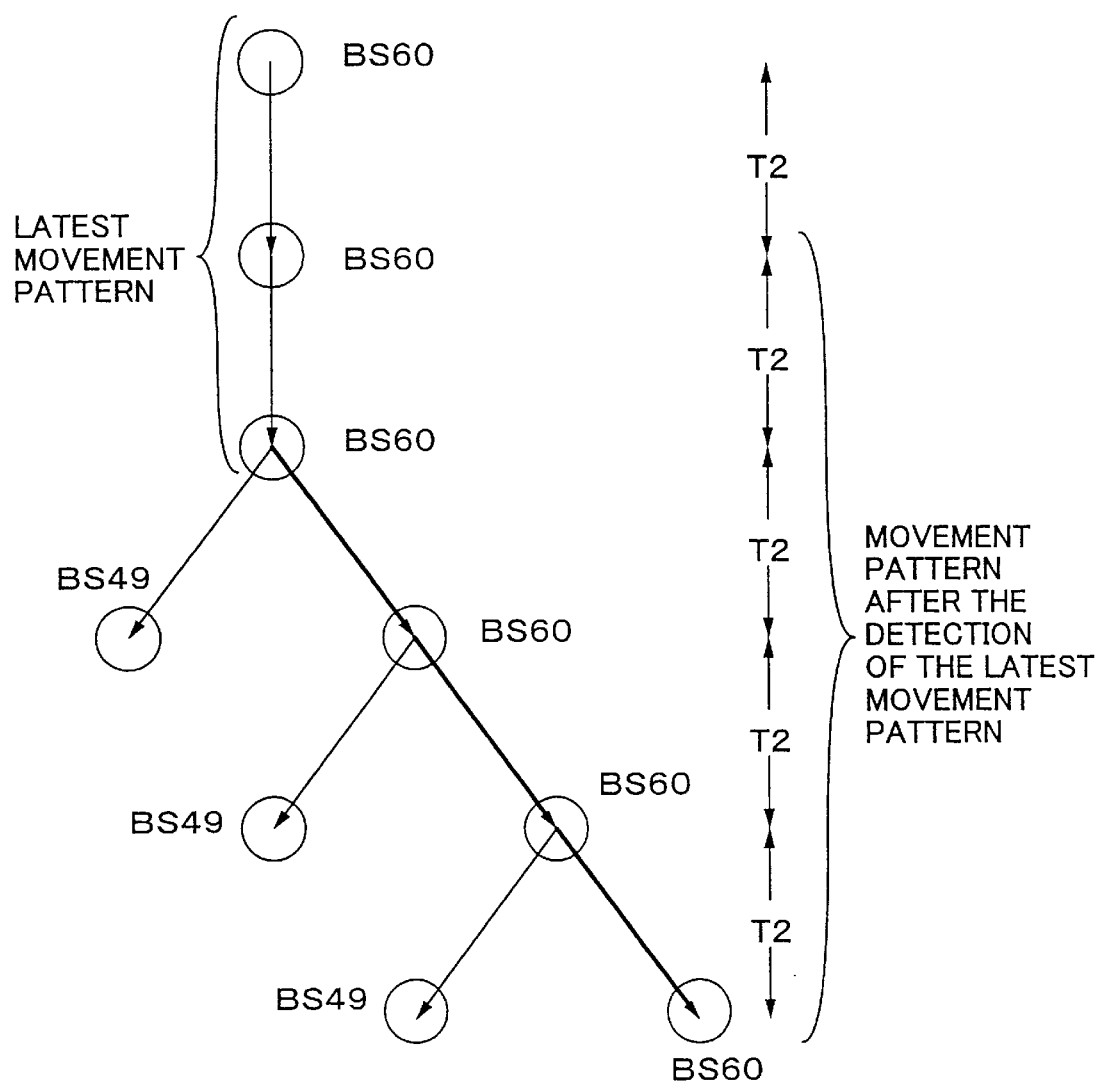
FIG. 13 shows another motion characteristics tree.

FIG. 13 shows a motion characteristics tree in a case where the mobile device stays at one point. In this case, the probability of the mobile device staying at BS60 is the highest, and there is a small possibility that the mobile device moves to BS49. As shown in the third line of FIG. 8, BS60 is registered as the personal location registration area.

Figure 14:
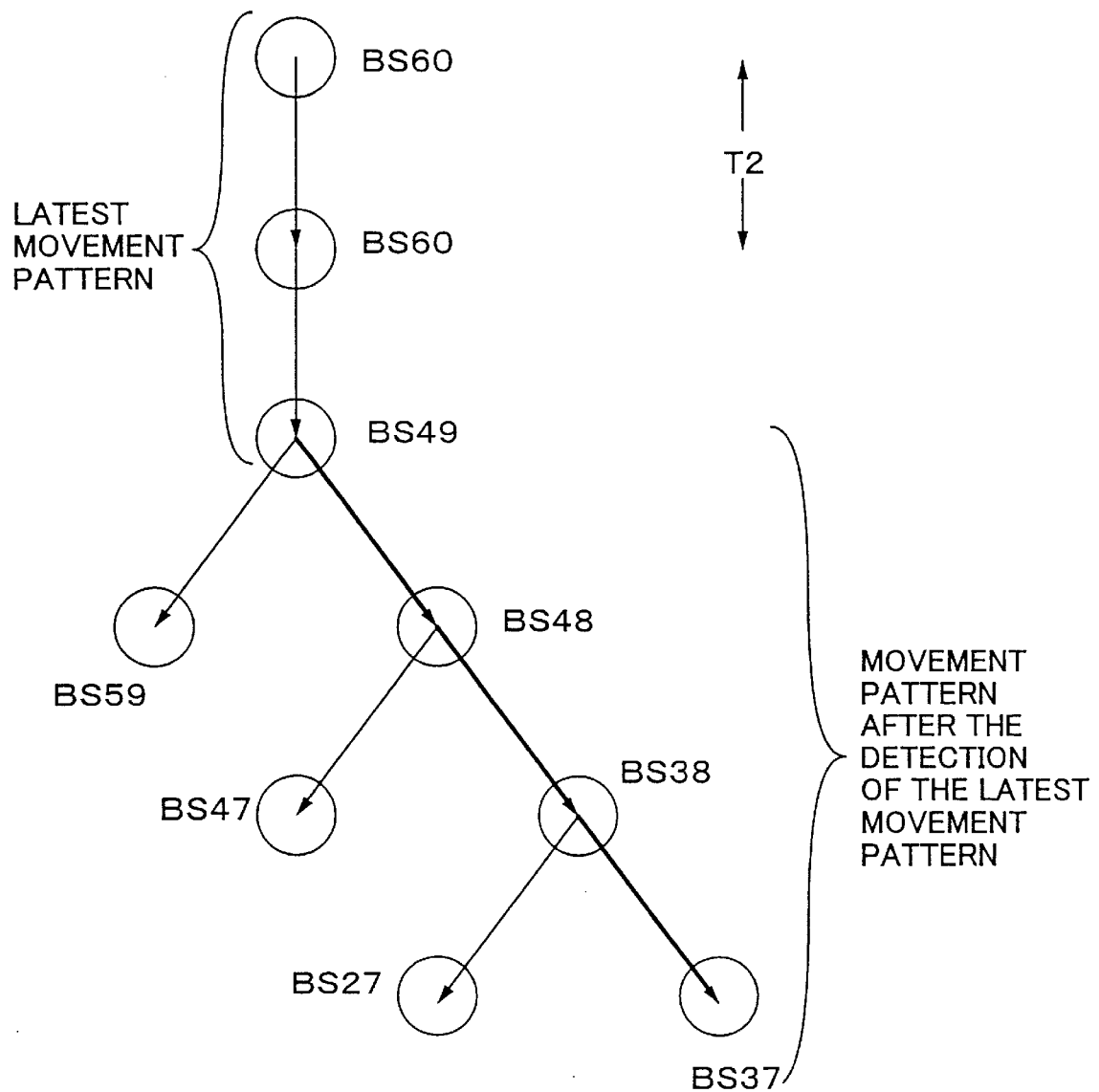
FIG. 14 shows yet another motion characteristics tree.

FIG. 14 shows a motion characteristics tree in a case where the mobile device starts moving away from BS60 and then moves to BS49. After the detection of BS60 to BS60 to BS49, the base stations having high probabilities of detecting the mobile device are BS48, BS38, and BS37. Accordingly, as shown in the line 4 of FIG. 8, BS49, BS48, BS38, and BS37 are registered as the personal location registration area. The mobile switching center MMS extracts the base stations that constitute the location registration area of the mobile device at the time of receiving a call, and a simultaneous call operation is performed on the extracted base stations.

As described above, a location registration operation is performed by predicting an area in which the mobile device will be next registered in accordance with the motion characteristics. Thus, the call signal traffic can be dramatically reduced without increasing the location registration signal traffic. Also, in a case where the mobile device stays at one location, the location registration area can be made up of only one base station. In such a case, the location registration area can be the smallest possible area, and the call signal traffic can be minimized accordingly. Generally, with the number of base stations to be simultaneously called being M, the call signal traffic can be 1/M. Also, with the simultaneous call operation, instead of a sequential call operation, no delay will be caused at the time of calling. It is believed that more and more communication services using paging channels (the use as pagers) will be used in the future, and that there will be a shortage of frequency bands. The present invention enables efficient frequency bands for use in paging channels, thereby improving the service in a mobile communication system.

The present invention is not limited to the specifically disclosed embodiments, but variations and modifications may be made without departing from the scope of the present invention.

The present application is based on Japanese priority application No. 2000-121675, filed on Apr. 21, 2000, the entire contents of which are hereby incorporated by reference.

What is claimed is:

1. A method of registering a location in a mobile communication system in which one or a plurality of base stations are connected to a mobile switching center that manages a location of a mobile device in accordance with a location registration from the mobile device, and in which a simultaneous call connection is conducted on the registered one or plurality of base stations when the mobile device receives a call, the method comprising the steps of:
transmitting a base station ID for identifying each base station from each corresponding base station, the base station ID being incorporated into notification information;
storing the base station ID as a history of the mobile device when the base station ID indicated by the notification information changes, or when a predetermined period of time has passed;
statistically predicting one or a plurality of base stations near which the mobile device will pass by next, in accordance with the latest history of the mobile device;
registering the predicted one or plurality of base stations as a personal location registration area; and
extracting the registered personal location registration area based on the history of the mobile device, thereby performing a location registration operation.

2. A mobile device in which one or a plurality of base stations are connected to a mobile switching center that manages a location of the mobile device in accordance with a location registration from the mobile device, and in which a simultaneous call connection on the registered one or plurality of base stations is carried out when the mobile device receives a call, the mobile device comprising:
a base station ID detection unit that detects a base station ID that identifies each base station, the base station ID being incorporated in notification information supplied from each corresponding base station;
a reception base station ID storage unit that stores the base station ID as a history of the mobile device, when the base station ID indicated by the notification information changes, or when a predetermined period of time has passed;
a predicted location registration unit that statistically predicts one or a plurality of base stations near which the mobile device will pass by next, in accordance with a latest history of the mobile device stored in the reception base station ID storage unit, and registers the predicted one or plurality of base stations as a personal location registration area; and
a location registration unit that extracts the personal location registration area registered in the predicted location registration unit, base on the history of the mobile device stored in the reception base station ID storage unit.

3. The mobile device as claimed in claim 2, wherein the predicted location registration unit comprises:
a personal location registration area determining unit that determines a combination of the latest history of the mobile device and the personal location registration area including a base station having a high probability that the mobile device will pass by next, in accordance with the history of the mobile device stored in the reception base station ID storage unit; and
a personal location registration area constituent information registration unit that registers the personal location registration area, with an entry being a part of the history immediately before the combination.

4. The mobile device as claimed in claim 2, further comprising a call rate measurement unit that measures a call frequency per hour,
wherein when the call frequency is high, the number of base stations that constitute the personal location registration area is small, and when the call frequency is low, the number of base stations that constitute the personal location registration area is large.

5. The mobile device as claimed in claim 3, further comprising a date switching unit that switches the personal location registration area constituent information registration unit depending on a day of the week, wherein the personal location registration area constituent information registration unit includes an information storage for each day of the week.

6. The mobile device as claimed in claim 2, further comprising an external power source detection unit that activates the predicted location registration unit when determining that an external power source is used for charging the mobile device.

7. The mobile device as claimed in claim 2, further comprising a memory usage detection unit that activates the predicted location registration unit when the memory usage of the reception base station ID storage unit exceeds a predetermined threshold value.

* * * * *